United States Patent [19]

Tanioka et al.

[11] Patent Number: 5,121,447
[45] Date of Patent: Jun. 9, 1992

[54] APPARATUS FOR PERFORMING GRADATION PROCESSING ON IMAGE DATA

[75] Inventors: Hiroshi Tanioka; Yasuhiro Yamada, both of Yokohama, Japan

[73] Assignee: Canon Kabushiki Kaisha, Tokyo, Japan

[21] Appl. No.: 514,616

[22] Filed: Apr. 26, 1990

[30] Foreign Application Priority Data

Apr. 27, 1989 [JP] Japan ............................ 1-105877
Sep. 25, 1989 [JP] Japan ............................ 1-246526

[51] Int. Cl.⁵ ............................................. G06K 9/38
[52] U.S. Cl. ................................. 382/50; 382/52; 382/53; 358/464; 358/466
[58] Field of Search ...................... 382/50–53; 358/445, 464–466, 450, 451, 453

[56] References Cited

U.S. PATENT DOCUMENTS

| | | | |
|---|---|---|---|
| 4,554,593 | 11/1985 | Fox et al. | 382/50 |
| 4,577,235 | 3/1986 | Kannapell et al. | 382/52 |
| 4,709,274 | 11/1987 | Tanioka | 382/53 |
| 4,893,188 | 1/1990 | Murakami et al. | 358/464 |
| 4,969,052 | 11/1990 | Ishida et al. | 382/50 |
| 4,975,786 | 12/1990 | Katayama et al. | 358/466 |

Primary Examiner—David K. Moore
Assistant Examiner—Jose L. Couso
Attorney, Agent, or Firm—Fitzpatrick, Cella, Harper & Scinto

[57] ABSTRACT

Image processing apparatus having an input device for inputting the data of an objective pixel, calculator for obtaining an average density value in a specified region and a quantizer for quantizing the data of the objective pixel based on the average density value. The entire image including its edge being effectively binarized and during serial scanning of the data continuity not being lost at the connection of scans, thereby obtaining an image with excellent gradation and resolution.

15 Claims, 10 Drawing Sheets

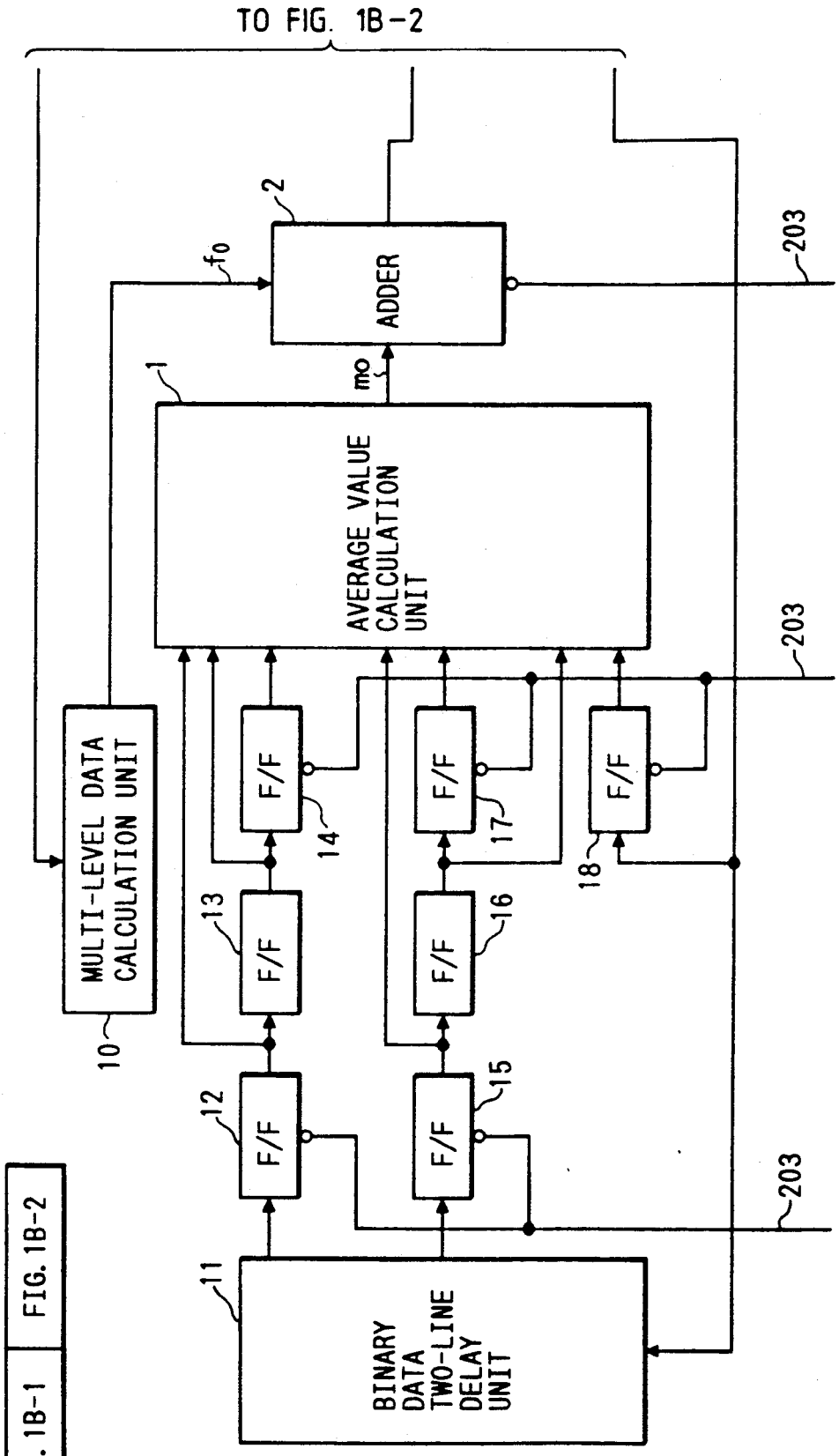

FROM FIG. 1B-1

FIG. 2A

| f(i-2,j-1) | f(i-2,j) | f(i-2,j+1) |
|---|---|---|
| f(i-1,j-1) | f(i-1,j) | f(i-1,j+1) |
| f(i,j-1) | f(i,j) | f(i,j+1) |
| | f(i+1,j) | |

FIG. 2B

| B(i-2,j-1) | B(i-2,j) | B(i-2,j+1) |
|---|---|---|
| B(i-1,j-1) | B(i-1,j) | B(i-1,j+1) |
| B(i,j-1) | B(i,j) | |

FIG. 2C

| R(2,1) | R(2,0) | R(2,-1) |
|---|---|---|
| R(1,1) | R(1,0) | R(1,-1) |
| R(0,1) | R(0,0) | R(0,-1) |

| 1/29 | 3/29 | 1/29 |
|---|---|---|
| 3/29 | 5/29 | 3/29 |
| 5/29 | 8/29 | |

FIG. 9A

| 1/21 | 3/21 | 1/21 |
|------|------|------|
| 3/21 | 5/21 | 3/21 |
| 5/21 | 0    | 0    |

FIG. 9B

| 1/48 | 3/48 | 5/48 | 3/48 | 1/48 |
|------|------|------|------|------|
| 3/48 | 5/48 | 7/48 | 5/48 | 3/48 |
| 5/48 | 7/48 | 0    | 0    | 0    |

FIG. 9C

| 5/255  | 15/255 | 27/255 | 16/255 | 8/255  |
|--------|--------|--------|--------|--------|
| 16/255 | 27/255 | 37/255 | 24/255 | 16/255 |
| 27/255 | 37/255 | 0      | 0      | 0      |

APPARATUS FOR PERFORMING GRADATION PROCESSING ON IMAGE DATA

BACKGROUND OF THE INVENTION

1. Field of the Invention

The present invention relates to an image processing apparatus which executes quantization of image data into binary data or multi-level data, particularly an image processing apparatus which executes intermediate shade (or gradation) processing of input image data.

2. Related Background Art

For the semi-intermediate (or pseudo gradation) processing system of the image processing apparatus such as facsimile or digital copying machine, others have so far proposed error a diffusion method, an average density approximation method, etc.

The error diffusion method is a method to binarize the multi-level image data of an objective pixel (to convert it into darkest level or shortest level), give specific weight to the difference between the binarized level and multi-level image data prior to binarization and add it to the data of the pixel near the objective pixel as disclosed in the literature of R. Floyd & L. Steinberg, entitled "An adaptive algorithm for spatial gray scale", SID 75 DIGEST, pp. 36-37.

The average density, approximation method is a method, as described in Japanese Unexamined Patent Publication (Kokai) No. 57-104369, wherein the weighted means value of the respective weights of the objective pixel binarized into black and white and that of the neighbouring pixel are obtained using the already binarized binary data of the pixel near the objective pixel and thereby the image data of the objective pixel are binarized using the average of the two mean values as the threshold.

Since the aforesaid error diffusion method is used to correct the error between the input image data and the output image data, it is possible to maintain the input image and the density of the output image processing unit and produce the image with excellent resolution and shade characteristics.

However, during the correction of the error between input image data and output image data, many two dimensional calculations must be made and the magnitude of processing volume is so large that the composition of hardware inevitably becomes complicated.

On the other hand, according to the average density approximation method, calculation is made using binary data after binarization and consequently the composition of hardware may be simplified and the processing can be made at a high speed since the processing volume is extremely small.

However, this method has a drawback since binarization is conducted simply through approximation of an objective pixel by the average value of the range which contains the objective pixel, number of shades is limited and a specific low frequency texture is generated to the image which has the gradually changing density and picture quality deteriorates.

Besides, the drawback common to these systems is that when the manuscript image is divided into more than two regions, discontinuity occurs between the data of the divided images and thus picture quality deteriorates.

In other words, the error diffusion method has such a drawback that at the point near the starting point of binarization of a divided image, the error for correction is not transmitted and it tends to become the so-called binarization processing by fixed threshold.

In view of the above, the applicant of the present invention has applied for a patent in U.S. patent application Ser. No. 203,880, now issued as U.S. Pat. No. 4,958,236, for the technology to provide continuity to the plural number of regions at the binarization by the error diffusion method.

However, the average density approximation method has such a drawback that at the calculation of average density, the already binarized data are not repeated and consequently the expression of intermediate shade becomes discontinuous at the connecting part between the divided images after binarization processing and thus picture quality deteriorates.

SUMMARY OF THE INVENTION

The present invention has been made with the objective to solve the aforesaid problems and it provides an image processing apparatus which can substantially reduce the processing volume for quantization and at the same time reproduce an image with excellent intermediate shade (or an excellent halftone image).

Another objective of the present invention is to provide an image processing apparatus which gives an accurate semi-intermediate shade to the terminal part of the binarized image in the serial scanning which has been the problem of the conventional method.

Still another object of the present invention is to provide an image processing apparatus wherein the binary data at the terminal part of each scanning are maintained until the execution of the succeeding scan in the serial scanning so that in the succeeding scan an average weighted density in reference to such binary data is obtained and thereby the continuity of the data at the connection between scans is established and an image with excellent shade characteristic (or gradation) and resolution is obtained.

Still another objective of the present invention is to provide an image processing apparatus which binarizes the multiple-level image data by the average value based on the binarized data within the specific range and which is equipped with the discriminating means to tell that no binary data exist at least at a part of the specified range and a multiple-level data conversion means which converts the pixel having no binary data discriminated by the said discriminating means into the normalized multiple-level data.

Through such arrangement, even when there exist no binarized binary data to be referred to at the time of binarization of the terminal part of the image, a weighted average density based on the binary data can be obtained equivalently using the multiple-level data at such position and an effective binarization can be made even at the terminal part of the image.

Still other objectives of the present invention shall be made clear from the detailed explanation based on the following drawings.

BRIEF DESCRIPTION OF THE DRAWINGS

FIGS. 2A-2D and FIGS. 3A and 3B are the drawings to explain the principle of the treating system of the image processing apparatus of the first embodiment.

FIGS. 9A-9C are the drawings to show the example of weight mask.

DETAILED DESCRIPTION OF PREFERRED EMBODIMENTS (First Embodiment)

An embodiment of the present invention is explained in detail in reference to the attached drawing.

Figure 1A:
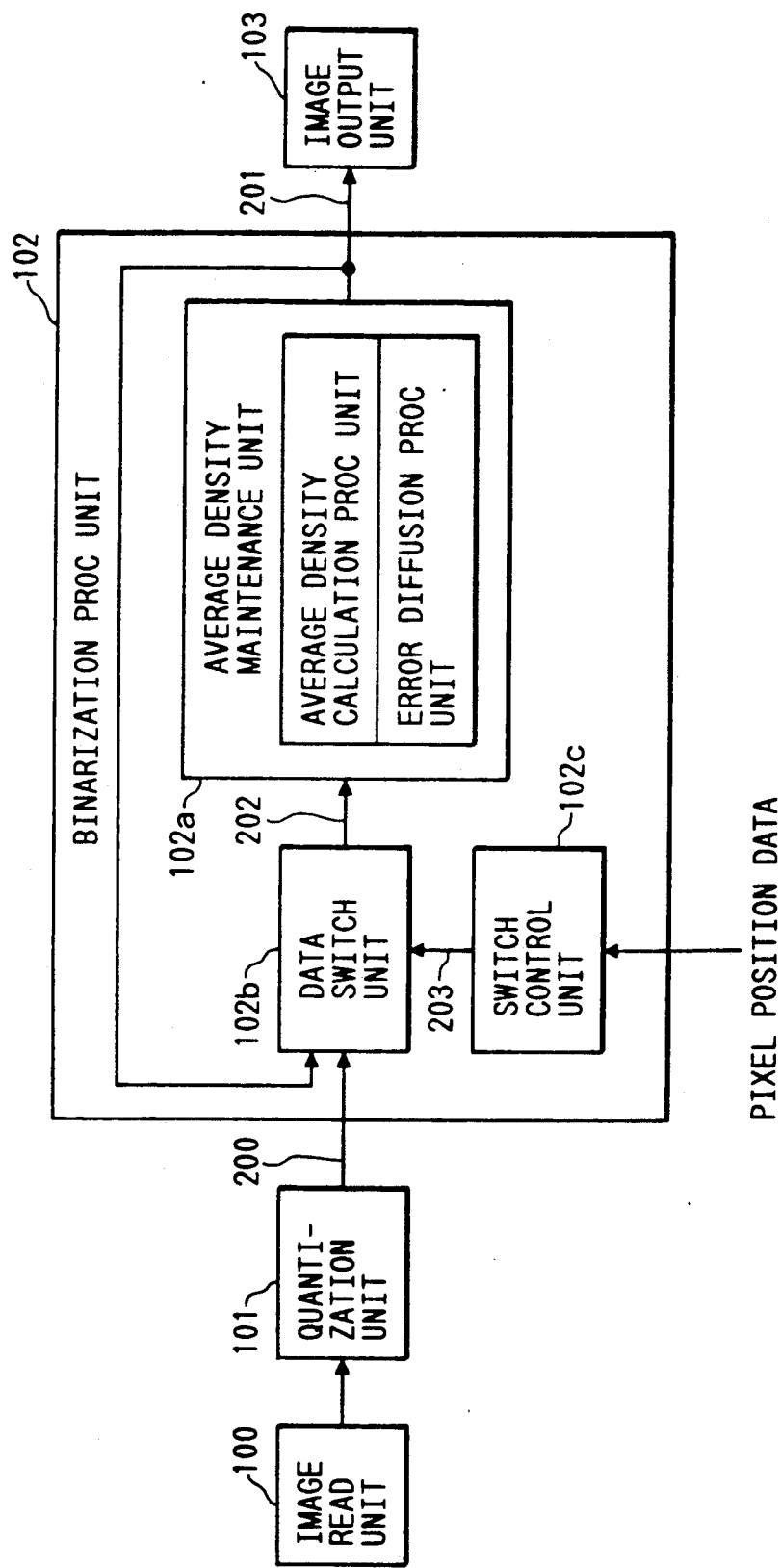
FIG. 1A is a block diagram indicating the composition of the image processing apparatus of the first embodiment.

FIG. 1A is a block diagram of the image processing apparatus of the present embodiment.

In FIG. 1A, 100 is the image read unit to read the image of the manuscript (or original) wherein the read analog image signal is input into quantization unit 101, converted into a digital signal, given publicly known correction processing such as logarithmic conversion, shading correction, etc. and the data 200 used for recording is obtained. The data 200 is input into the binarization processing unit 102 where the present system is executed, binarized and output as the binarized signal 201 and a binary image is produced as the semi-intermediate shade at image output unit 103. Here the binarization processing unit 102 is composed of data switch unit 102b which switches binary data 201 and multiple-level data 200 in the calculation of average density, average density maintenance unit 102a, comprising the average density calculation processing unit and the error diffusion processing unit, and switch control unit 102c, which controls switching at the data switch unit 102b.

The image processing equipment of this embodiment is the so-called serial scanning unit which reads the manuscript in bands with width of l and length of m and reproduce it as binary data.

Next the principle of the binarization system of the present embodiment is explained. In the present embodiment, the conventional average density approximation method modified by addition of the error diffusion method is introduced as the preferred binarization method. This method has been applied for a patent by the present applicant in the following applications:

(1) Pending U.S. patent application Ser. No. 476,766 filed on Feb. 8, 1990 on the basis of priority claim of Japanese Patent Application Nos. 1-31404, 1-31405, 1-31408, 1-31409 (all applied on Feb. 10, 1989).

(2) Pending U.S. patent application Ser. No. 731,380 filed on Jul. 16, 1991, which is a continuation of application Ser. No. 476,618 filed applied in on Feb. 7, 1990, now abandoned, on the basis of priority claim of Japanese Patent Application Nos. 1-31411 (applied on Feb. 10, 1989) and 1-284879 (applied on Nov. 2, 1989).

In FIG. 2A, f (i, j) indicates the multiple density data of an input image at the objective pixel to be binarized and the values are the normalized 0-1 value. The pixel position above the dotted line is already binarized and after binarization of the objective pixel, similar processing is executed one after another in the order of f (i, j+1), f (i, j+2), . . . .

FIG. 2B is a diagram showing the binarized image data and B (i, j) shows the density of an objective pixel after binarization (the values of 0 or 1). The part surrounded by dotted lines is the pixel data which are already binarized at the time of processing of objective pixel and they are used during the binarization processing of the objective pixel.

FIG. 2C is a drawing showing the weight-giving mask and FIG. 2D is a drawing showing the example of a actual figures of weight-giving mask. R is an example of the weight-giving mask for obtaining average density and it is expressed by the matrix of having a 3×3 size. The weight of the position where the objective pixel falls is R (0, 0) and it is used as R (0, 1)=0.

Under this system, the average density of the output image near the objective pixel when the objective pixel is binarized into either black or white is named m1 (i, j) and m1 (i, j) which are determined by the following formula.

$$m1(i,j) = \sum_{x=0}^{2} \sum_{y=-1}^{1} R(x,y) \cdot B(i-x, j-y) \quad (1)$$

[here, B (i, j)=1, that is, the case when the objective pixel is deemed black]

$$m0(i,j) = \sum_{x=0}^{2} \sum_{y=-1}^{1} R(x,y) \cdot B(i-x, j-y) \quad (2)$$

[here, B (i, j)=0, that is the case when the objective pixel is deemed white]

Next, using the aforesaid average density m1 and m0, the multiple-level density f (i, j) of the objective pixel is binarized by the following formula.

When $f(i,j) + E(i,j) > (m1(i,j) + m0(i,j))/2$, (3)
$B(i,j) = 1$,
$E(i, j+1) = f(i,j) + E(i,j) - m1(i,j)$ When $f(i,j) + E(i,j) \leq (m1(i,j) + m0(i,j))/2$,
$B(i,j) = 0$,
$E(i, j+1) = f(i,j) + E(i,j) - m0(i,j)$ In the above formulae 3, E (i, j) is the error which is produced when the multiple-level density (i, j−1) of the pixel (i, j−1) one position prior to the objective pixel (i, j) is binarized into binary density B (i, j−1). Binarization of input pixel density of (i, j−1) into 1 or 0 means that the pixel (i, j−1) has been approximated into either m1 (i, j−1) or m0 (i, j−1) which represent the average density in its neighbourhood and in each case, an error of f (i, j−1)−m1 or f (i, j−1)−m0 is generated between such density and the multiple-level density f (i, j−1) of input pixel. Therefore, by binarizing the value corrected by adding such binarized error E (i, j) to the objective pixel of (i, j), it is possible to completely maintain the density of the binarized image for the entire range of the input image. The most important characteristic of this system is in the processing method that takes into account the error of binarization thus providing by far better intermediate shade reproducing potency when compared to the aforesaid average density approximation method.

Figure 3A:
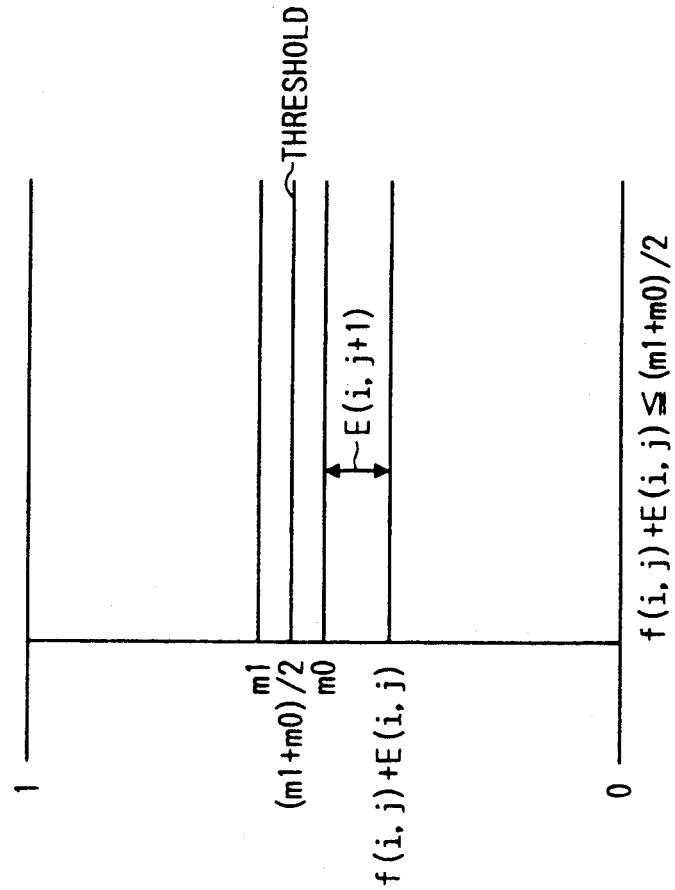
Figure 3B:
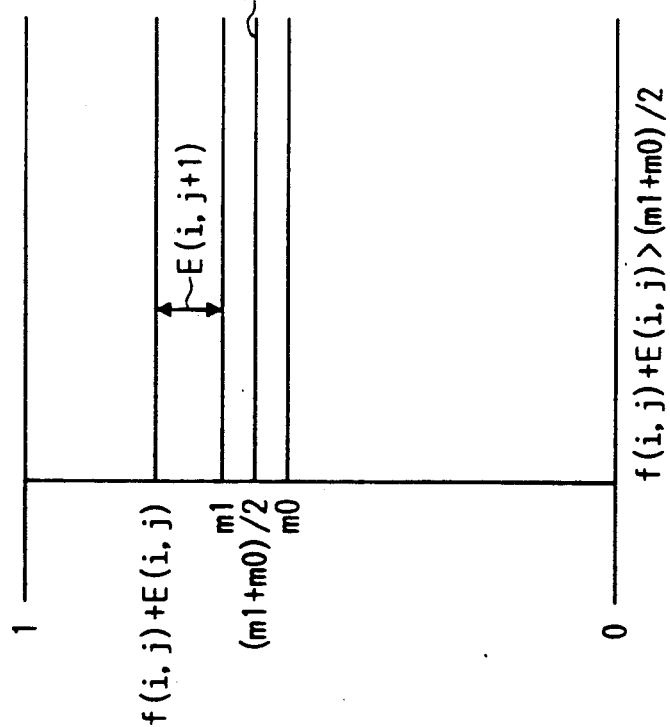

In formula (3), E (i, j+1) is the error to be allocated to the pixel (i, j=1) one pixel after the objective pixel (i, j). As shown in FIG. 3A and 3B, E (i, j+1) is the balance given by subtracting m1 from f (i, j)+E (i, j) when f (i, j)+E (i, j)>(m1+m0)/2 and the balance given by subtracting m0 from f (i, j)+E (i, j) when f (i, j)+E (i, j)≦(m1+m0)/2.

Like above, in the present embodiment of the average density maintenance method, in spite of the processing volume being extremely small when compared to that of the error diffusion method, the same or even better image reproducing capacity is obtained. It is because, in this method, in spite of the aforesaid error being corrected only by the adjacent one pixel, by obtaining the average density of binarized multiple data, the similar effect is obtained by the correction by equivalent distribution of error over multiple pixels.

In this respect, the aforesaid average density approximation method does not consider the error as taken into account by this method and it is evident that the image reproducing potency of this method is better than that of the average density approximation method.

Figure 4:
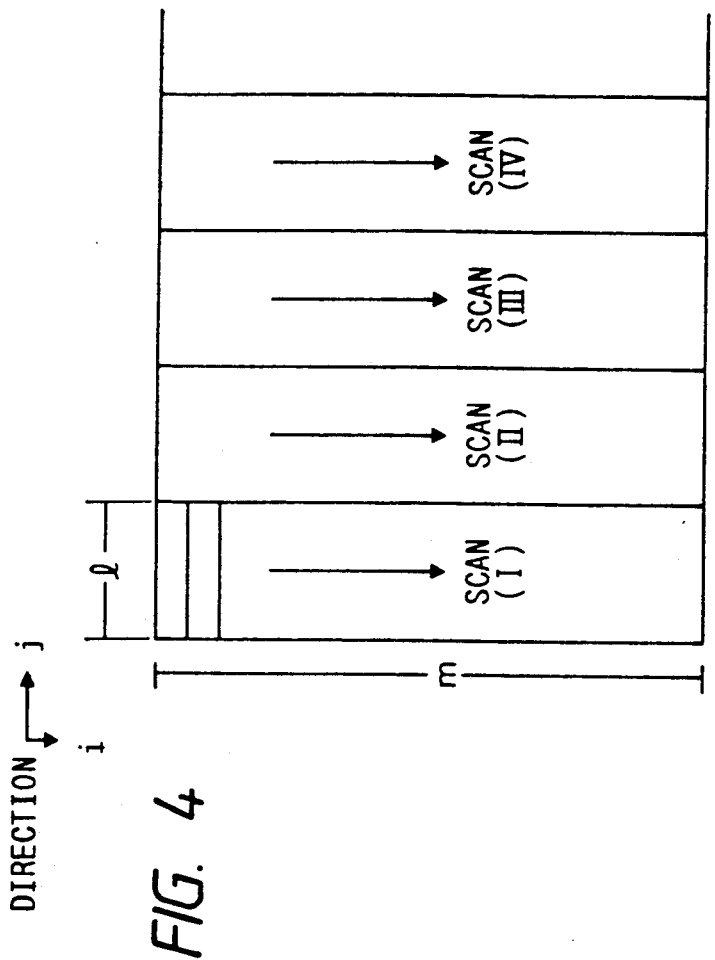
FIG. 4 is the drawing to explain the scanning system of the image processing apparatus of the first-third embodiments.

When the aforesaid average density maintenance method is applied to the serial scanning equipment which executes binary reproduction while reading the manuscript in bands with width of l and length m as shown in FIG. 4, processing becomes discontinued at the connection of scan (I) and scan (II). When the right end part in the direction j of scan (I) is f (i, j) of FIG. 2A, B (i−2, j+1) and B (i−1, j+1) for the average value calculation are not binarized. On the contrary, if the objective pixel of f (i, j) is located at the left end part in the j direction of scan (II), an additional memory is required because the binarized results must be stored during the execution of scanning (I) for three pixels, B (i−2, j−1), B (i−1, j−1) and B (i, j−1) in FIG. 2B. Therefore in this embodiment, for the aforesaid pixel having no binarized data, binarization is conducted by calculating the average value of the multiple-level data.

In order to materialize this embodiment, the width of the image input at image reading unit 100 should be l+2 pixel by adding one pixel at both sides and the length should be m+2 pixels by adding 2 pixels on top, while the multi-level data of 3 pixels at the left end in the j direction immediately preceding thereto and two pixels at the right end in the j direction or 2 pixels at the upper end in the i direction are maintained. In other words, in FIG. 4, the upper end part in the i direction and left end part of scan (I) require the similar processing as aforesaid but in this embodiment, binarized data of several lines at the upper end and the left end are neglected by regarding the data below several lines at the end part as effective image region.

For example, when the objective pixel f (i, j) indicated in FIG. 2A is the starting point of binarization of the image, 7 pixels in the binarized image surrounded by the dotted lines are not binarized and the objective pixel f (i, j) can not be binarized according to the aforesaid algorithm. Therefore, in this embodiment the weighted average values m1 and m0 of the point are calculated by using multi-level data. In other words, at the time of binarization of f (i, j), B (i−2, j−1) is substituted by f (i−2, j−1),
B (i−2, j) is substituted by f (i−2, j),
B (i−2, j+1) is substituted by f (i−2, j+1),
B (i−1, j−1) by f (i−1, j−1),
B (i−2, j) by f (i−1, j).
B (i−1, j+1) by f (i−1, j+1) and
B (i, j−1) by f (i, j−1)

and in this way average values m1 and m0 are calculated to obtain B (i, j). At the binarization of the succeeding pixel f (i, j+1), among 7 pixels to be referred to, B (i, j) is excluded and for the remaining 6 pixels, multiple-level data are used, while at the binarization of f (i, j+2), out of 7 pixels, B (i, j+1) is excluded and for the rest of 6 pixels, multiple-level data are used and in this way each pixel is binarized one after another by calculating m1 and m0 using the binarized data and multiple-level data in the same way as above. By so doing, the entire data can be binarized without making discontinued binarization of the end part of the image.

Figures 1, 1B, 2:
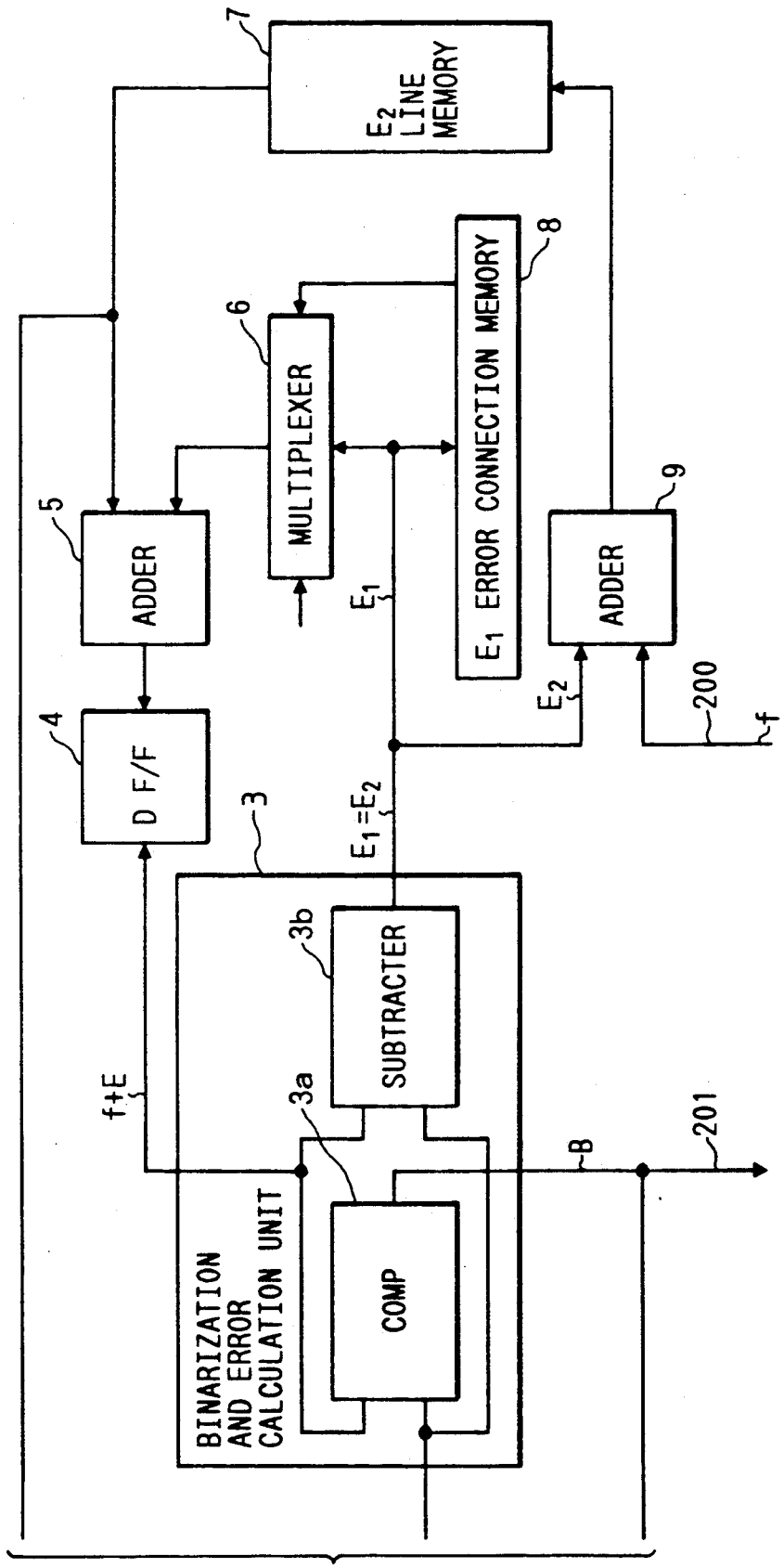
FIG. 1B, 1B2 is a block diagram to indicate the detailed composition of the binarized processing unit of the first embodiment.

The detailed circuit block shown in FIG. 1B illustrates the block of the binarized processing which is even free from the discontinuity inherent to the error diffusion having been added by this system. At the average value calculation unit 1, the binary data of D flip-flop (hereinafter called D·F/F) 12, 13, 14, 15, 16, 17 and 18 and those of FIFO 11, which delays the binary data by 2 lines, are simultaneously entered while maintaining the relative position of 7 pixels surrounded by the dotted line in FIG. 2A and the aforesaid average density m0 is output. At the average value calculation unit 1, data conversion is executed based on the binary data of 7 pixels and the preset standardized weight R (x, y) as shown in FIGS. 2C and 2D. Average calculation unit 1 is composed of ROM.

Adder 2 functions only at the starting point and end point of binarization and the weighted average value (added value) for 3 or 2 pixels based on the multiple-level data calculated at multiple-level data calculation unit 10 is added to the aforesaid ROM output, i.e., the weighted average value m0 based on other binary data. The binary data corresponding to the output of the multiple-level data calculating part 10 i.e., the output of D·F/F 14, 17 and 18 or D·F/F 12 and 15 are primarily reset to "0" by the timing generation circuit output not shown in the drawing. In other words, the operating signal of the aforesaid adder 2 and reset signal D·F/F are the switch signal 203 shown in FIG. 1A.

The binarization and error calculation section 3 to be composed of comparator 3a and subtracter 3b outputs the binarized results of the image from the multiple-level data (f+E) corrected and standardized by the error to be started later and the weighted average value (m0+f0) and the already known weight R (0, 0), according to the formula (3). Simultaneously, binarized results are input into the binary data two line delay unit 11.

On the other hand, error E2 (=E1=½E) is input into the adder, and corrects the input multiple-level data (i, j) first by E2. The output of the said adder 9 is input into the E2 line memory 7 and delayed by one line. 5 is the adder which corrects the data corrected only for the output of the said E2 line memory 7 i.e., the objective ith line E2, by adding the error E1 wherein error E1 is usually selected as it is by multiplexer 6 and input into the adder 5. E1 error connection memory 8 is the memory which stores the E1 error to be carried over and added to the leading pixel of the scan (II) until the execution of the succeeding scan (II), the addition being done when the final pixel of each ith line is binarized and binarization is executed in the j direction for each line at the execution of the next scan, i.e., the scan (I) in FIG. 3 and the pixel at the boundary to the scan (II) is binarized.

The memorized E1 data is read at the time of execution of scan (II) and only when the leading pixel is binarized, it is selected by multi-multiplexer 6 and added to the aforesaid adder 5. The error may be transmitted to the binarization processing of the leading pixel by the E1 error connection memory 8.

The data corrected by error E1 and E2 are delayed by D·F/F 4 by one pixel and input into the binarization and error calculating unit 3 and the same action is repeated pixel by pixel.

Multiple-level data calculating unit 10 is composed of 5 D·F/Fs and an adder and it can execute the performance easily when it is so arranged that it maintains by latching the leading multiple-level data and terminal multiple-level data line by line and maintains it by shifting the internal D·F/F according to the 1 line synchrosignal.

When the weighted mask becomes more than 3×3 of the present embodiment, the calculating volume of the multiple-level calculating unit becomes large, but sufficient effect is obtained if, for example, f (i, j) is an 8 bit data length, calculation is done by using the upper 2 or 3 bits.

Since the average calculation unit executes multiplication and addition calculation of 1 bit data and fixed value, it is possible to execute calculation by making it a several hundred gate integrated circuit using gate array etc. even without using ROM and in FIG. 1B, it can be executed by the gate array of 2-3000 gates except for memory.

In the binarization method shown in this embodiment, it is possible to obtain the results of high shade expression by the conventional density approximation method and by the process simpler than that of the conventional error diffusion process even when the weight R (0, 0) of the objective pixel is made zero and therefore if the calculation of average error is simplified by making R (0, 0)=0, it is particularly profitable in realizing the aforesaid average value calculation unit made of a gate array.

Besides, the distribution of error is not limited to 2 pixels and the region of average value calculation mask and its weight are not limited to this embodiment.

Further it is also possible to reproduce a colored image by using the circuit of the present embodiment in three colors of R, G and B.

In the case of this embodiment, explanation was made on the example where one average value is obtained and input data are binarized, but as disclosed in U.S. application Ser. No. 731,380, with Japanese Patent Application Nos. 1-31411 (applied on Feb. 10, 1989) and 1-284879 (applied on Nov. 3, 1989) as the basis of priority claim, it may be so arranged that plural numbers of average are obtained and they are used also in the conversion of input data into multiple-level data.

As aforesaid, according to the first embodiment, image processing equipment is provided wherein the binarized image terminal can be accurately processed for semi-intermediate shade in the serial scanning.

In other words, in the absence of the already binarized binary data to be referred to at the binarization of the terminal of the image by equivalent calculation of the weighted average value based on the binary data using the multiple-level data at the same position, it is possible to binarize the entire region even from the terminal of the image and obtain the effective results for whole region. It is also possible to maintain continuity of binarization by propagating the error diffusion.

In the aforesaid first embodiment, when there exist no binary data at the boundary of scanning regions, average density is calculated by using multiple-level data. In a second embodiment to be explained hereunder, it is so arranged that the binarization closer to the original manuscript is executed by providing the means to maintain the results of binarization of the preceding region.

In the second embodiment, the average density value is obtained by assuming that the weight mask for the objective pixel f (i, j) is R (0, 0)=0 and binarization processing based on such assumption shall be explained.

In this case, since the multiple-level data, binary data and weight mask are the same as those indicated in FIGS. 2A-2D, explanation shall be made in reference to FIGS. 2A-2D.

FIG. 2A is the drawing to indicate the multiple-level density of each pixel of the input image.

In FIG. 2A, f (i, j) indicates the multiple density data of input image at the objective pixel position to be binarized and they shall be expressed in the normalized 0-1 value. The pixel position above the dotted line is already binarized and after binarization of the objective pixel, similar binarization is conducted for f (i, j+1), f (i, j+2), . . . one after another.

FIG. 2B is the drawing to show the binarized image data and B (i, j) indicates the density after binarization of the objective pixel (expressed by "0" or "1"). The part surrounded by dotted lines is the pixel data which has already been binarized at the time of processing the objective pixel and they are used at the binarization of the objective pixel.

FIG. 2C is the drawing to show the weighted mask. R is an example of weighted mask to obtain the average density and it is expressed by the matrix of 3×3 size. The weight against the unbinarized pixel R is used as R (0, 0)=R (0, −1)=0.

In this embodiment, the weighted average density of binary image in the neighbourhood of the objective pixel is named m (i, j) and it is calculated by the following formula;

$$m(i,j) = \sum_{x=0}^{2} \sum_{y=1}^{1} R(x, y) \cdot B(i - x, j - y) \quad (4)$$

Objective pixel f (i, j) is binarized by the following formulae (5) using the said average density m (i, j) and already allotted binarized correction value E (i, j).

When f (i, j)+E (i, j)>m (i, j), B (i, j)=1
err (i, j)=f (i, j)+E (i, j)−m (i, j)
When f (i, j)+E (i, j)≦m (i, j), B (i, j)=0
err (i, j)=f (i, j)+E (i, j)−m (i, j)
Here, when f (i, j)+E (i, j)=m (i, j)=1,
B (i, j)=1
E (i, j)=E1 (i, j)+E2 (i, j),
E1 (i, j+1),=E2 (i+1, j)=err (i, j)/2

Figure 5A:
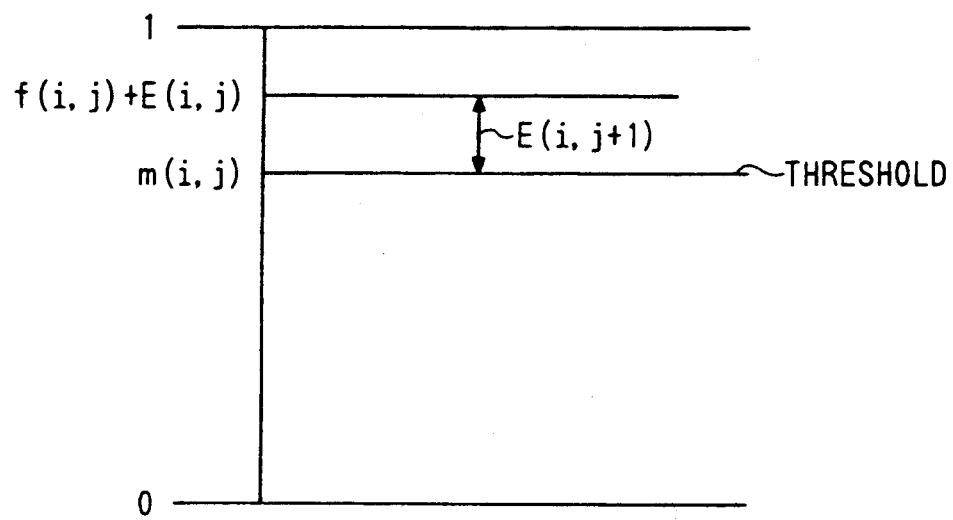
FIGS. 5A and 5B are the drawings to explain the principle of binarization executed by the second and third embodiments.
Figure 5B:
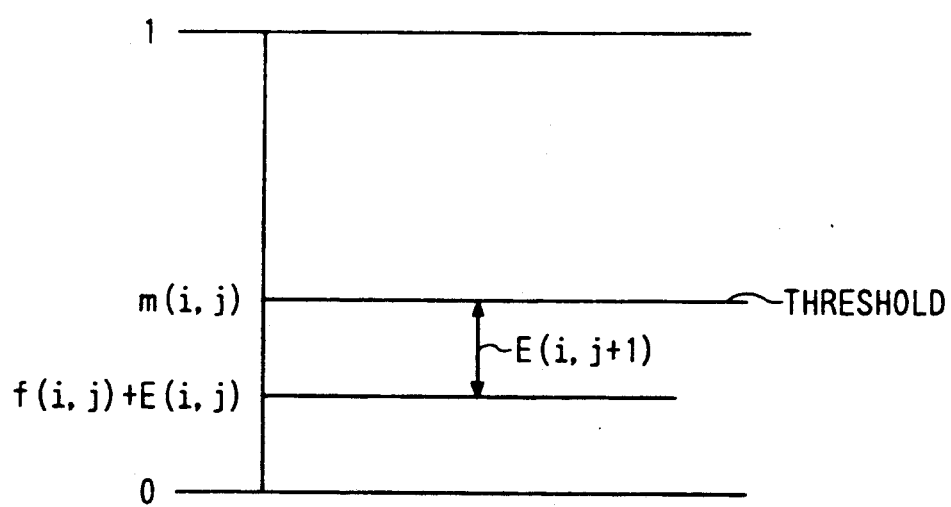

FIGS. 5A and 5B indicate the aforesaid formulae (5) in diagram.

In formulae (5), E (i, j) is the sum of the error produced when multiple-level density f (i, j−1) of the pixel one step prior to the objective pixel (i, j) or pixel (i, j−1) is binarized into binarized density B (i, j−1), i.e., ½ of the difference between the multiple denisty f (i, j−1) and the average density m (i, j−1) in the neighbourhood and the error produced when the multiple-level density f (i−1, j) of the pixel one line prior to the objective pixel (i, j), i.e., ½ of the difference between multiple-level density f (i−1, j) and the average density in the neighbourhood m (i−1, j).

By adding such binarization error E (i, j) to the objective pixel f (i, j) and binarizing the connected value, it is possible to completely maintain the image density after binarization in the form of average density for the entire range of the input image.

By processing the image data taking into account the binarization error as aforesaid, intermediate shade reproducing potency greatly improves when compared to the aforesaid average density approximation method.

In formulae (5), $E_1$ (i, j+1) is the error alotted to the pixel (i, j+1), which is one pixel after the objective pixel (i, j), while $E_2$ (i−1, j) is the error allotted to the pixel (i+1, j) one line after the objective pixel (i, j).

Like above, the binarization system in this embodiment provides the image reproducing potency equal or better than the binarization by the conventional error diffusion process in spite of the processing volume being extremely small. It is because in spite of the said error being corrected only by the two adjacent pixels, by obtaining the average density from the binarized plural number of data, the same effect is obtained to the case of correction made by distribution of the error equivalently to the plural number of pixels.

Figure 6:
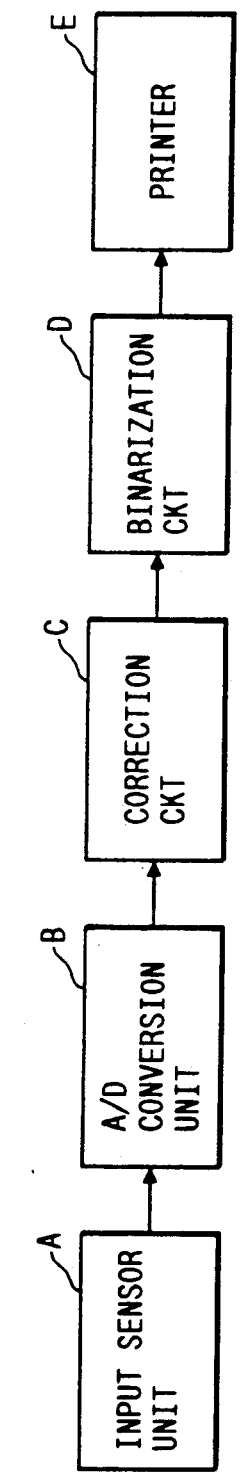
FIG. 6 is the block diagram to show the composition of the image processing apparatus of the second and third embodiments.

FIG. 6 is the block diagram of the image processing equipment of the present embodiment.

In FIG. 6, input sensor unit A is composed of photoelectric conversion device such as CCD and the driving equipment for scanning and it scans and reads the manuscript and the image data of the manuscript read by input sensor A are delivered to the A/D converter B one after another. A/D converter B converts the data of each pixel into 8 bit digital data and quantizes it into the data with 256 levels of shades (gradation). Then at the correction circuit C, shading correction is effected by digital calculation for correction of irregularity of the sensitivity of CCD sensor at input sensor unit A and irregularity of illuminance caused by illumination source.

The data already corrected by correction circuit C is delivered to the binarization circuit D. At binarization circuit D, the 8 bit multiple-level image data input by the correction circuit C is quantized into 1 bit binary data by the aforesaid system of the present embodiment.

Printer E is the printer which is composed of a laser beam or ink jet system and reproduces the read image on the recording sheet by on/off control of printed dots based on the binary data delivered from binarized circuit D.

When the input sensor unit A has such construction as illustrated in FIG. 4, the manuscript is read in the bands of l in width and m in length and reproduced in binary data according to the so-called serial scanning, but there is the fear that the discontinuity of processing occurs at the connections between scans [for example between scan (I) and (II)].

It is because, if the right end section in the j direction of scan (I) is f (i, j) as indicated in FIG. 2A, B (i−2, j+1) and (i−1, j+1) for calculation of average density are not yet binarized as they are the data to be binarized in the succeeding scan (II).

Therefore in this embodiment, the multiple-level data of the two pixels to be processed in the succeeding scan (II) are overlappingly read and they are applied by substituting the binary data.

On the other hand, when the objective pixel f (i, j) is located at the left end section in the j direction of scan (II), binary data at 3 pixels, namely, B (i−2, j−1), B (i−1, j−1) and B (i, j−1) in FIG. 2B are required but such data are already binarized in the preceding scan (I).

Therefore in this case, the binary data of the said 3 pixels are memorized by the data maintenance means of the present embodiment at the time when they are binarized in the preceding scan (I) and they are applied by substituting the present data.

In FIG. 4, at the upper end section in the i direction in each scanning and at the left end section in the j direction in scan (I), the aforesaid processing is required but in this embodiment, several lines at the top end section are neglected because only the part below several lines at the front end are recorded as the effective image region.

Figure 7:
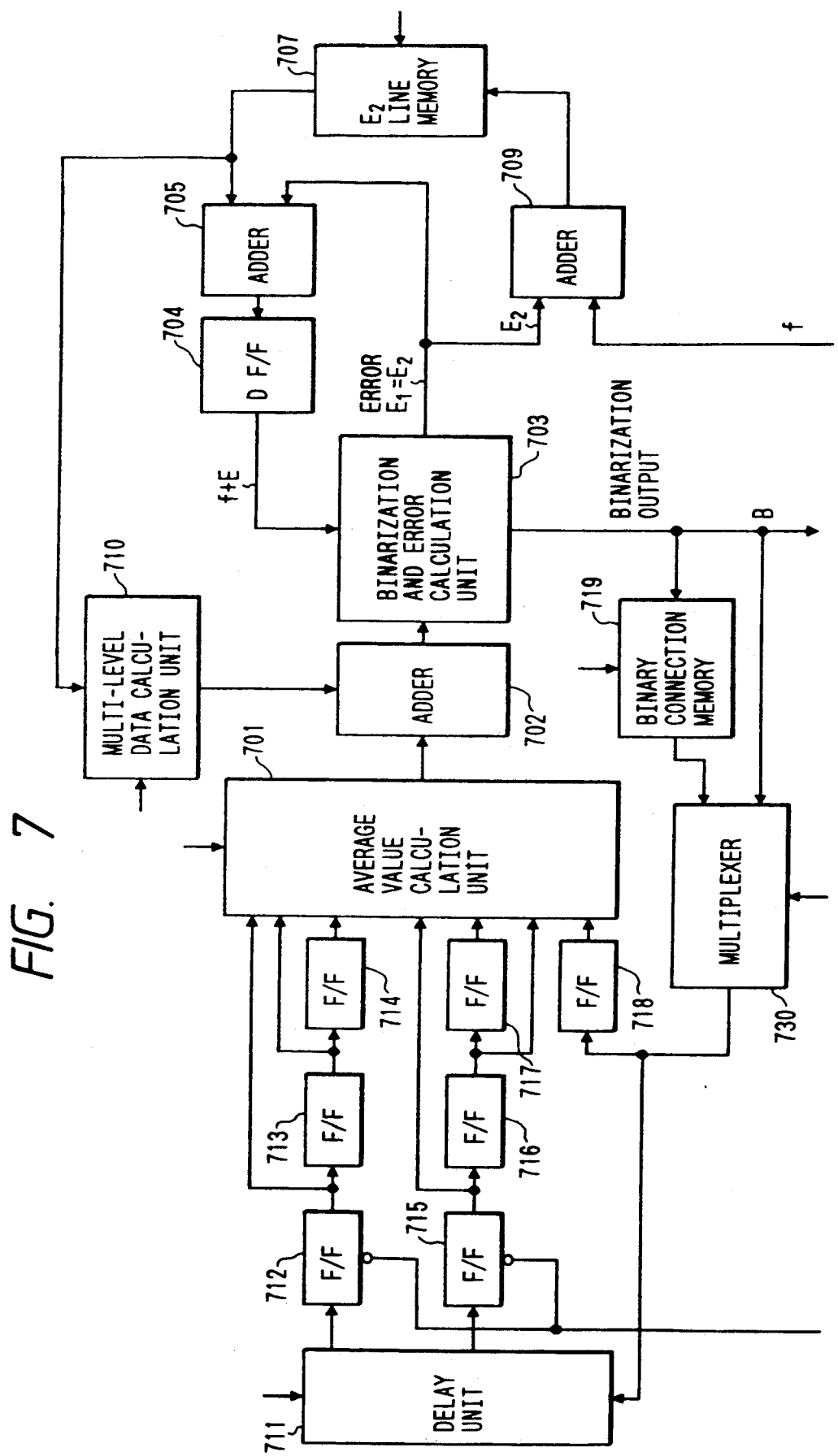
FIG. 7 is the block diagram to indicate the details of the binary circuit of the second embodiment.

FIG. 7 illustrates the detailed block composition of the binarized section based on the aforesaid algorithm in binarized circuit D of the present embodiment.

Hereunder is explained in detail the binarization processing based on the aforesaid algorithm of the present embodiment in reference to FIG. 7.

In FIG. 7, 701 is the average value calculating unit wherein by the delay unit 711 comprising the FIFO buffer which delays the flip-flop (F/F) 712-718 and binarized data by 2 lines, the mutual binarized data are simultaneously input while maintaining the relative positions of 7 pixels surrounded by the dotted line in FIG. 2A and thus the aforesaid average density m is output, and 701 is composed of ROM which executes data conversion based on the preset weight R. 702 is the adder which functions only at the end point of binarization but adds the weighted average density (added value) of 2 pixels based on the multiple-level data calculated by the multiple-level data calculating unit 710 on to a part of the weighted average density m based on other binarized data output from the ROM of the average operating unit 701.

At this time, the binary data corresponding to the output from the multiple-level data calculating unit 710, i.e., F/F12 and 15 output are primarily reset at "0" by the timing generation circuit output not shown in the drawing.

703 is the binarization and error calculation unit which is composed of a comparator and deductor, and it outputs the multiple-level data (f+E) corrected by the specified error to be stated later and the binarized data of the image based on the weighted average density m. This binarized data output can also be output at the delay unit 711.

The error $E_2$ (=$E_1$) output at the binarization and error calculating unit 703 is output at the adder 709. At the adder 709, multiple-level data of input from one side are first corrected by error $E_2$. The correction output from adder 709 is input into $E_2$ line.

On the other hand, the error $E_1$ (=$E_2$) which is output at binarization and error calculating section 703 are also output at the adder 705.

At one side of adder 705 is input the delay output from $E_2$ line memory 707 which is the correction output coming from adder 709, i.e., the data corrected only by $E_2$ at the objective ith line and further correction is conducted by adding error $E_1$ to the aforesaid correction data at the said adder 705.

Like above, the output data from the adder 705 which has been corrected by $E_1$ and $E_2$ are delayed by one pixel by D type F/F 704 and input into binarization and error calculation unit 703 and the aforesaid actions are repeated for each pixel.

The multiple-level data calculating section 701 may be composed of two D type F/F and an adder. Its function can be easily executed when it takes such construction that it latches and maintains line by line the multiple-level data for one pixel which belongs to the succeeding scanning region and shifts and maintains the internal F/F according to one line synchro-signal.

Further the binarized data given out by the binarization and error calculation unit 703 are also output at binary connection memory 719. Binary connection memory 719 stores only the binarized data at the terminal section of each line synchronizing with a one line synchro signal, out of all the binarized outputs of binarization and error calculation unit 703 and after delaying it by one scanning period, outputs it at multiplexer 730. When multiplexer 730 is selected, the data are input in F/F 718 and delay processing section 711.

The said processing takes place only at the starting end of the line at each scanning time after scanning (II) and average value calculation unit 701 handles the data as the binary data of the pixel at the place T pixels prior to the starting point of line binarization.

Thus in this embodiment, it is possible to calculate the average density m as a continuous value at the connection of scanning angles.

As explained above, according to this embodiment, by maintaining the binary data of the connecting part of the scanning regions until the execution of succeeding region and obtaining the weighted average density based on the binary data in reference to such data in the succeeding scanning, it is possible to avoid discontinuity of data at the connections between scanning regions and obtain the image with excellent gradation characteristics and resolution.

(The third embodiment)

In the second embodiment explained above, at the connection of the scans, continuity has been maintained by carrying over only the binary data but the present invention is not limited to the aforesaid embodiment but may be modified in various ways.

Figure 8:
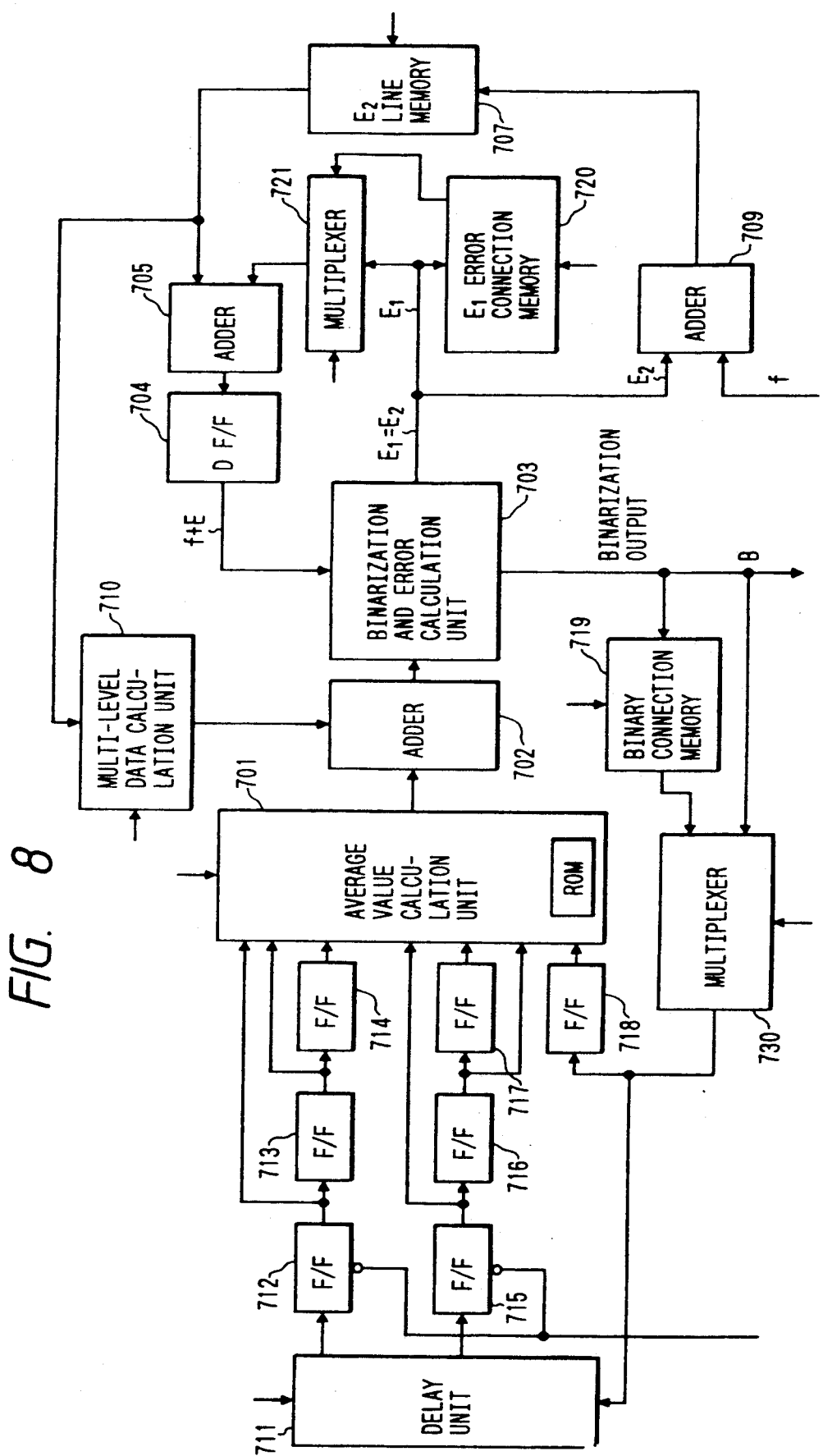
FIG. 8 is the block diagram to indicate the details of the binary circuit in the third embodiment.

For example, as shown in FIG. 8, more accurate binarization may be conducted by constructing the binarization circuit D in such way that the error $E_1$ having generated at the binarization of the terminal pixel of each line in the preceding scan (the error to be used for correction of leading pixel of each line in the succeeding scanning region) is carried over for correction.

The third embodiment of the present invention having the binarization circuit D so constructed as shown in FIG. 8 is explained in detail hereunder.

In FIG. 8, the compositions similar to those of FIG. 7 are given the same numbers to those of FIG. 7 and detailed explanations thereof are omitted.

In the third embodiment indicated in FIG. 8 such construction is employed that the error $E_1$ output at the binarization and error calculation unit 703 is not directly entered into the adder 705, but is entered into it via the multiplexer 721. Simultaneously, error $E_1$ is also input into error connection memory 720 and the output of the error connection memory 720 is entered at one side of the input of the said multiplexer 721.

The error connection memory 720 is the memory which, at the time of binarization of the terminal pixel of each line in j direction at the execution of scan (I), stores the error $E_1$ to be carried over and added to the leading pixel of the succeeding scan until the succeeding scan i.e., scan (II) is executed and the $E_1$ data memorized by the error connection memory 720 is read at the execution of scan (II) and only at the time of binarization of the leading pixel, it is selected by the multiplexer 721 and input into the aforesaid adder 5 and corrects only the said leading pixel.

By such control, the binary data of the terminal part of each scan is preserved until the succeeding scan is executed and at the execution of the succeeding scan, the data are referred to and by obtaining the weighted average density based on the binary data the leading pixel of each scan is also corrected, thus the data not becoming discontinuous at the connection of scans and the image with excellent gradation and resolution being obtained.

The binary connection memory 719 which delays and holds the binary data during one scan so that they are used for the calculation of the average value m at the time of binarization of the leading pixel at each line of the succeeding scan as explained in the second embodiment and the error connection memory 720 which delays and holds the $E_1$ error data to be used for correction of the said pixel at the binarization of the said pixel as explained in the third embodiment are so controlled that their writing and reading are executed by the same timing and the data of the two combined are less than 8 bit.

Therefore the aforesaid composition can all be constructed on one chip.

In the 2nd and 3rd embodiments, the weight mask of $3 \times 3$ matrix as shown in FIG. 9A is used but to smoothly binarize the intermediate section, it is generally desirable to set the weight of the pixel adjacent to the objective pixel smaller.

Therefore when the weight mask of $3 \times 5$ matrix shown in FIG. 9B is used, R $(i-j)$, R $(i, j-1)$ is $7/48 = 0.15$ while that of FIG. 9A is $5/21 = 0.24$ and therefore the intermediate shade section is more smoothly reproduced in the binary data.

When the weight mask of $3 \times 5$ matrix as shown in FIG. 9C is used, R $(2, -1) = 16/255$, R $(2, -2) = 8/255$, R $(1, -1) = 24/255$ and R $(1, -2) = 16/255$ and multiple-level data used for connection between scans are obtained mainly by the calculation by shift operation and hardware may be more simplified.

Multiple-level data calculation unit 710 bears a large calculation load when the weighted mask becomes over $3 \times 3$, but if for example f is an 8 bit data length, the calculation may be done using about 2-3 bits of the superior position and yet satisfactory effect is obtained.

In the above explanation, the calculation of average density m has been conducted simply by ROM table built in the average value calculation unit 701 but such calculation may be executed by using a plural number of adders.

By composing it in such a way, the processing speed may be further increased. It goes without saying that by bulding it into the gate array etc., the scale of hardware can be substantially reduced.

In the aforesaid embodiments, the error is equally distributed over 2 pixels but distribution of such error is not limited to two pixels, also neither the ratio of distribution is not limited to equal ratio but may be distributed to an arbitrarily selected pixel. The distribution of error is neither restricted by the average value calculation mask region or its weight.

In the aforesaid embodiments, explanation was made on the case where the kind of input data is one (one color), but the input data of the present invention are not limited to one color but the data input may be made in 3 colors, red (R), green (G) and blue (B) and it may be applied to the color image processing equipment.

As explained above, according to this embodiment, even when there is no binary data to be referred to at the time of binarization of the image end, it is possible to obtain equivalently the weighted average density based on the binary data using the multiple-level data at the same position and thus an effective binarization can be done from the end of the image.

In case when serial scanning is conducted, binary data at the terminal of each scan are preserved until the execution of the succeeding scan and at the execution of the succeeding scan, the weighted average density based on the binary data is obtained in reference to such preserved data and thus the data at the connection of scans do not become discontinued, thus providing the image with excellent gradation and resolution.

As explained above, according to the present invention, effective binarization is possible from the end of the image as the result of such method of processing.

Also in the case of serial scanning, the data at the connection of scans do not become discontinued and the image with excellent gradation and resolution is obtained.

We claim:

1. An image processing apparatus which inputs data of a first region of an image and performs quantization on the data of the first region and then inputs data of a second region of the image and performs quantization on the data of the second region, said apparatus comprising:

input means for inputting data of an objective pixel;
    calculating means for obtaining an average density value in a specified region, using data quantized in the vicinity of the objective pixel; and
    quantization means for quantizing the data of the objective pixel, using a threshold value based on the average density value obtained by said calculating means,
    wherein said calculating means calculates the average density value for quantizing the data of the objective pixel of the second region, such that continuity between the second region and the earlier quantized first region is maintained, and
    wherein said quantization means quantizes the data of the objective pixel using the threshold value based on the average density value such that the continuity is maintained between the first and second regions.

2. An apparatus according to claim 1, wherein said quantization means, when quantizing the data of the pixel in the first region, overlappingly reads the data of the second region and binarizes the data of the objective pixel based on the average density value obtained from multi-level data of the second region and the binary data of the first region.

3. An apparatus according to claim 1, wherein a memory to store the binary data obtained by binarizing the pixel in the first region is provided and said quantization means, at the quantization of the data of the pixel in the second region, binarizes the data of the objective pixel based on the average density value obtained form the binary data stored in said memory and the binary data in the second region.

4. An apparatus according to claim 1, wherein said quantization means is provided with the means to execute correction by adding the error generating at the quantization on to the pixel not processed yet and the memory means to temporarily store the error in order to add it to the pixel in the region succeeding the region being processed.

5. An apparatus according to claim 1, wherein said calculation means calculates the average density $m_1$ in the specified region when the data of the objective pixel are quantized into 1 and the average density value $m_2$ in the specified region when the data of the objective pixel are quantized to 0.

6. An apparatus according to claim 5, wherein said calculation means calculates the average density value in the specified region by using the specified weight mask.

7. An apparatus according to claim 5, wherein said quantization means binarizes the data of the objective pixel by using $(m_1+m_2)/2$ as the threshold.

8. An apparatus according to claim 1, wherein said input means input the data obtained by adding the error data having generated at the quantization of the pixel preceding the objective pixel on to the data of objective pixel.

9. An apparatus according to claim 1, wherein said calculating means calculate the average value m from the data of the specified region already quantized which precedes the objective pixel.

10. An apparatus according to claim 9, wherein said calculating means comprises a read only memory (ROM) which uses the said quantized data in the specified region as address and outputs the average density value m.

11. An apparatus according to claim 9, wherein said quantization means binarizes the data of the objective pixel by using the said average density value m as threshold.

12. An image processing apparatus which binarizes multi-level image data by an average value based on binary data of plural pixels of a predetermined area having been already binarized, said apparatus comprising:

discriminating means for discriminating whether or not a pixel on which binarization is not completed exists in at least a part of the plural pixels in the predetermined area; and
    multi-level data replacement means for replacing the data of the pixel on which binarization is not completed, when said discrimination means discriminates that such pixel exists, by a value obtained by regulating the multi-level data;
    average value means for obtaining the average value of the predetermined area from the value that is obtained by regulating the multi-level data and replaced by said multi-level data replacement means; and
    binarization means for binarizing the multi-level image data of the objective pixel, using the average value as a threshold value.

13. An apparatus according to claim 12, wherein said apparatus is further provided with the error diffusion means to diffuse the error produced by the binarization and the error propagation means to propagate the error between different scans.

14. An image processing apparatus which inputs data of a first region of an image and performs binarization on the data of the first region and then inputs data of a second region of the image and performs binarization on the data of the second region. said apparatus comprising:
- input means for inputting data of an objective pixel;
- calculation means for obtaining an average density value in a specified region preceding the objective pixel which has been already binarized, using binary data;
- binarizing means for binarizing the data of the objective pixel using the average density value as a threshold value;
- correction means for correcting an error generated in the binarization of the objective pixel; and
- data preservation means for preserving the binarization data when performing binarization on the data of the first region and the error generated during the binarization, so as to be used when performing binarization on the date of the second region.

15. An apparatus according to claim 14, wherein said calculation means and binarization means execute calculation of the average density value and binarization of the pixel in the region succeeding the first region using the output of said binarization means preserved in the said data preservation means, after completion of binarization of the 1st region.

* * * * *

UNITED STATES PATENT AND TRADEMARK OFFICE
CERTIFICATE OF CORRECTION

PATENT NO. : 5,121,447

DATED : June 9, 1992

INVENTOR(S) : HIROSHI TANIOKA, ET AL.

Page 1 of 5

It is certified that error appears in the above-identified patent and that said Letters Patent is hereby corrected as shown below:

TITLE PAGE, ITEM [56] REFERENCES CITED

Under U.S. PATENT DOCUMENTS, insert:
--4,958,236  9/1990  Nagashima et al. ..... 358/445
  4,821,334  4/1989  Ogino et al. ......... 382/50--.

Insert:    --    FOREIGN PATENT DOCUMENTS
               57-104369   6/1982   Japan .

OTHER PUBLICATIONS
"An Adaptive Algorithm for Spatial Grey Scale",
SID 75 Digest, Floyd et al., pp. 36-37.--.

COLUMN 1

Line 14, "the" should read --an--.
Line 16, "error a" should read --an error--.
Line 27, "density," should read --density--.
Line 32, "neighbouring" should read --neighboring--.
Line 44, "two" should read --two- --.
Line 57, "number" should read --the number--.

COLUMN 3

Line 16, "embodiment;" should read --embodiment; and--.
Line 19, "PREFERRED" should read --THE PREFERRED--.
Line 49, "reproduce" should read --reproduces--.
Line 63, "applied in" should be deleted.
Line 65, "applied" should read --filed--.
Line 66, "applied" should read --filed--.

UNITED STATES PATENT AND TRADEMARK OFFICE
CERTIFICATE OF CORRECTION

PATENT NO. : 5,121,447
DATED : June 9, 1992
INVENTOR(S) : HIROSHI TANIOKA, ET AL.

It is certified that error appears in the above-identified patent and that said Letters Patent is hereby corrected as shown below:

COLUMN 4

Line 15, "a actual figures of" should read --actual figures of a--.
Line 23, "ml (i, j)" should read --m0 (i, j)--.
Line 24, "formula." should read --formulae.--.
Line 36, "is the" should read --is, the--.
Line 51, "formulae 3," should read --formula 3,--.
Line 58, "neighbourhood" should read --neighborhood--.

COLUMN 5

Line 44, "pixel" (first occurrence) should read --pixels--.

COLUMN 6

Line 29, "Average calculation unit 1" should read --Average value calculation unit 1--.
Line 38, "part 10 i.e.," should read --part 10, i.e.,--.
Line 59, "memory 7 i.e.," should read --memory 7, i.e.,--.

COLUMN 7

Line 46, "Further" should read --Further,--.
Line 53, "applied" should read --filed--.
Line 54, "(applied on Nov. 3, 1989)" should read --(filed on Nov. 2, 1989)--.

COLUMN 8

Line 40, "neighbourhood" should read --neighborhood--.
Line 42, "formula;" should read --formula:--.

UNITED STATES PATENT AND TRADEMARK OFFICE
CERTIFICATE OF CORRECTION

PATENT NO. : 5,121,447
DATED : June 9, 1992
INVENTOR(S) : HIROSHI TANIOKA, ET AL.

It is certified that error appears in the above-identified patent and that said Letters Patent is hereby corrected as shown below:

COLUMN 8

Line 48, "formulae ⑤ " should read --formula ⑤ -- and "said" should be deleted.
Line 49, "alotted" should read --allotted--.
Line 59, "formulae ⑤ " should read --formula ⑤ --.
Line 60, "formulae ⑤ ," should read --formula ⑤ ,--.
Line 66, "neighbour-" should read --neighbor- --.

COLUMN 9

Line 3, "neighbourhood" should read --neighborhood--.
Line 13, "formulae ⑤ ," should read --formula ⑤ ,-- and "alotted" should read --allotted--.
Line 21, "said" should be deleted.
Line 24, "to" should read --as in--.
Line 29, "of photoe-" should read --of a photoe- --.

COLUMN 10

Line 7, "said" should be deleted.
Line 17, "are" should read --is--.
Line 18, insert heading: --(The Second Embodiment)--.
Line 27, "flip-flop (F/F) 712-718" should read --flip-flops (F/F 712-718--.
Line 40, "operating unit 701." should read --value calculating unit 701.--.
Line 43, "F/F12 and 15" should read --F/F 712 and 715--.
Line 66, "said" should be deleted.

UNITED STATES PATENT AND TRADEMARK OFFICE
CERTIFICATE OF CORRECTION

PATENT NO. : 5,121,447

DATED : June 9, 1992

INVENTOR(S) : HIROSHI TANIOKA, ET AL.

It is certified that error appears in the above-identified patent and that said Letters Patent is hereby corrected as shown below:

COLUMN 11

Line 21, "said" should be deleted.
    Line 31, "the" (first occurrence) should be deleted and "of succeeding" should read --of the succeeding--.

COLUMN 12

Line 8, "said" should be deleted.
    Line 25, "said" (both occurrences) should be deleted.
    Line 29, "bit." should read --bits.--.
    Line 32, "2nd and 3rd" should read --second and third--.
    Line 64, "neither" should be deleted.

COLUMN 13

Line 66, "form" should read --from--.

COLUMN 14

Line 11, "into" should read --to--
    Line 22, "input" (second occurrence) should read --inputs--.
    Line 27, "calculate" should read --calculates--.

UNITED STATES PATENT AND TRADEMARK OFFICE
CERTIFICATE OF CORRECTION

PATENT NO. : 5,121,447
DATED : June 9, 1992
INVENTOR(S) : HIROSHI TANIOKA, ET AL.

It is certified that error appears in the above-identified patent and that said Letters Patent is hereby corrected as shown below:

<u>COLUMN 16</u>

Line 5, "date" should read --data--.

Signed and Sealed this

Twelfth Day of October, 1993

Attest:

BRUCE LEHMAN

*Attesting Officer*    *Commissioner of Patents and Trademarks*